United States Patent
Uebelstädt

[11] 3,847,428
[45] Nov. 12, 1974

[54] SHOCK ABSORBER

[75] Inventor: Manfred Uebelstädt, Ingolstadt, Germany

[73] Assignee: Audi NSU Auto Union A.G., Ingolstadt, Germany

[22] Filed: Aug. 9, 1972

[21] Appl. No.: 279,278

[30] Foreign Application Priority Data
July 17, 1971   Germany............................ 2135855

[52] U.S. Cl.......................... 293/96, 293/86, 293/99
[51] Int. Cl............................................. B60r 19/06
[58] Field of Search ......... 293/71 R, 75, 76, 77, 78, 293/79, 85, 86, 89, 91, 92, 93, 94, 96, 99; 267/139, 165

[56] References Cited
UNITED STATES PATENTS
| | | | |
|---|---|---|---|
| 1,464,594 | 8/1923 | Beale | 293/71 R |
| 1,644,046 | 10/1927 | Weiland | 293/96 |
| 1,773,928 | 8/1930 | Ambush | 293/85 |
| 1,825,086 | 9/1931 | Ohlendorf | 293/85 |
| 2,793,900 | 5/1957 | Marshall | 293/71 R |
| 3,493,257 | 2/1970 | Fitzgerald et al. | 293/71 R |
| 3,596,963 | 8/1971 | Phillips | 293/76 |
| 3,638,985 | 2/1972 | Barton et al. | 293/71 R |

Primary Examiner—M. Henson Wood, Jr.
Assistant Examiner—Robert Saifer
Attorney, Agent, or Firm—Richards & Geier

[57] ABSTRACT

A shock absorber is supported by dashpots upon a motor car. The invention is particularly characterized in that preferably the ends of the shock absorber are fixed by separate springs to the motor car.

5 Claims, 6 Drawing Figures

SHOCK ABSORBER

This invention relates to a shock absorber supported by dashpots upon a motor car. Such shock absorbers are known. In case of an accident the shock absorber can be deflected, while the effect of shocks extending in the direction of the longitudinal can axis can be diminished. To be able also to receive shocks in an inclined direction additional structural parts are necessary.

An object of the present invention is to provide simple means for receiving shocks which in case of an accident act upon the shock absorber from all different directions.

Other objects will become apparent in the course of the following specification.

In the accomplishment of the objectives of the present invention it was found desirable to fix preferably the ends of the middle portion of the shock absorber by separate springs to the motor car. The dashpots and then the springs help to move the shock absorber into the initial position. The springs also support the shock absorber. The springs jointly with the dashpots receive forces acting in an inclined direction upon the shock absorber.

A sheet spring located at the ends of the middle portion of the shock absorber can be bent in a C-shaped manner or image-like thereto about a vertical axis. The sheet springs can be then arranged within the shock corners, they carry the shock absorber, they provide resistance to a side shifting of the shock absorber and they make possible an effective absorption of forces acting upon the shock absorber by the frame or the body of the motor car.

Telescopically operating dashpots can be provided to cooperate with the springs which connect through joints with vertical axis the shock absorbers with the motor car. Thus the shock absorber is carried only by the springs and in case of a shifting is guided parallel to the plane of the drive, while the telescopic dashpots carry out the damping work.

Strips can be provided within the sheet springs which act to limit the movement. The ends of these strips are bent toward the interior of the springs and have an increasing greater curvature than the corresponding parts of the sheet springs. This arrangement makes it possible in a simple manner to limit the bending of the sheet springs and to determine the characteristic line of the sheet springs, for example, to shape it progressively. The sheet springs can be covered by shock corners, with the result that the shock absorber will have a smooth easily useable outer surface.

Furthermore, the sheet springs can be formed in shock corners preferably of porous material with compressed outer surfaces. This simplifies the manufacture and provides damping in the shock absorber against possible swingings.

The shock corners can be also made of rubber and can then enclose, for example, with cheek-like parts, a part of the sheet springs from above and from the bottom. They can be made independently from the sheet springs and clamped during construction with the sheet springs. The shock corners can be also screwed into a transverse closure plate of the middle part of the shock absorber. The transverse closure plate increases the firmness of the middle part of the shock absorber and transmits with simple means forces acting upon the middle part of the shock absorber into or upon the corresponding parts of the motor car.

Furthermore, the dashpot can be fixed in a bracket by a bolt and the bracket can be fixed by screws to the shock absorber. This provides a simple arrangement with commercially available parts.

The bracket can be also supported at its free ends with bands at the middle part of the shock absorber. It fulfills the additional purpose of helping the middle part of the shock absorber to resist turning.

Finally, a scuffle located under the radiator grille can extend over the upper belt of the shock absorber. This arrangement also makes easier the servicing and the keeping clean of the shock absorber. It also makes it possible for the shock absorber to receive the shock and to carry out the necessary rearward deviating movement without any damage to the parts of the motor car.

A front shock absorber has been described. However, the above-described features are equally applicable to a shock absorber located upon the rear end of the motor car.

The invention will appear more clearly from the following detailed description when taken in connection with the accompanying drawings showing by way of example only, preferred embodiments of the inventive idea.

Figure 1:
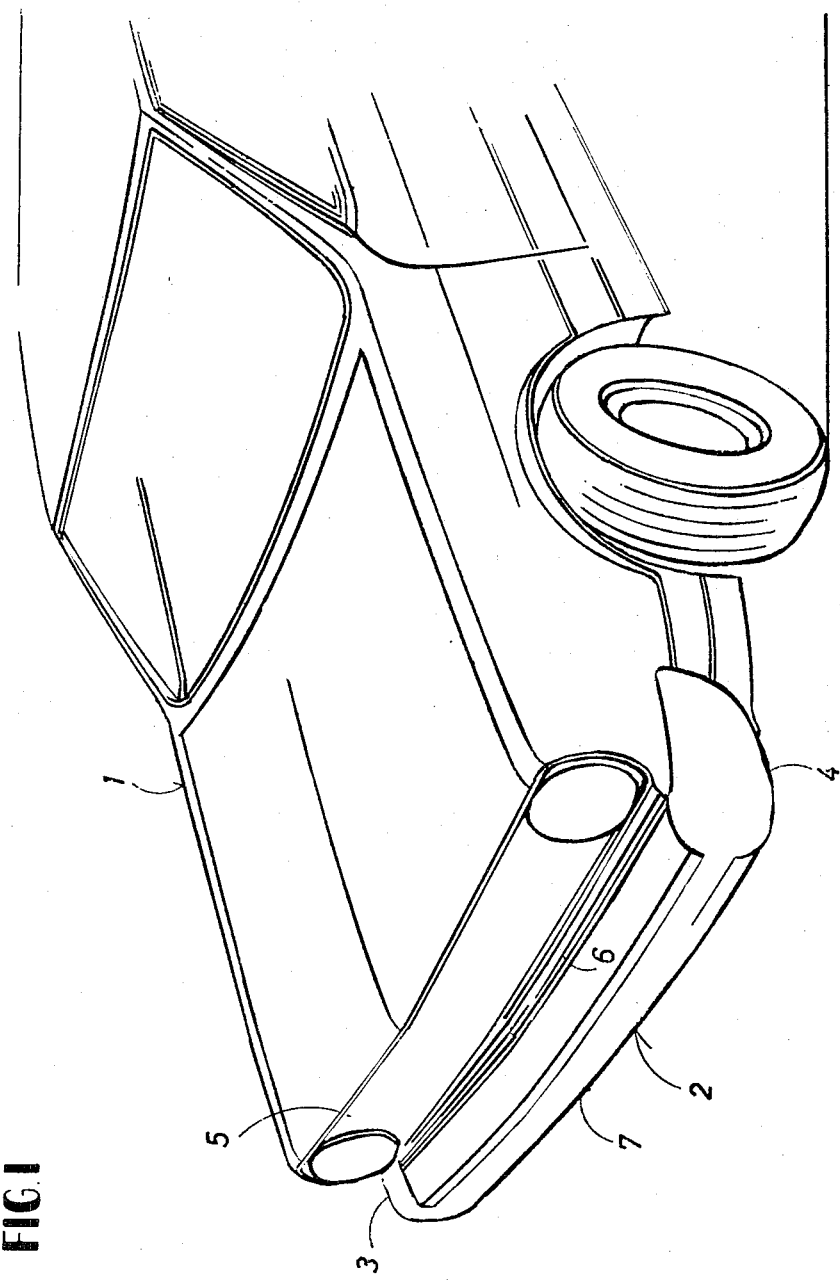
FIG. 1 is a perspective view of a front portion of a motor car provided with a shock absorber of the present invention.

FIG. 1 shows a motor car 1 carrying a shock receiver 2 to the sides of which shock corners 3 and 4 are joined. Under the radiator grille 5 a scuffle 6 is arranged which covers the middle portion 7 of the shock absorber 2.

Figure 2:
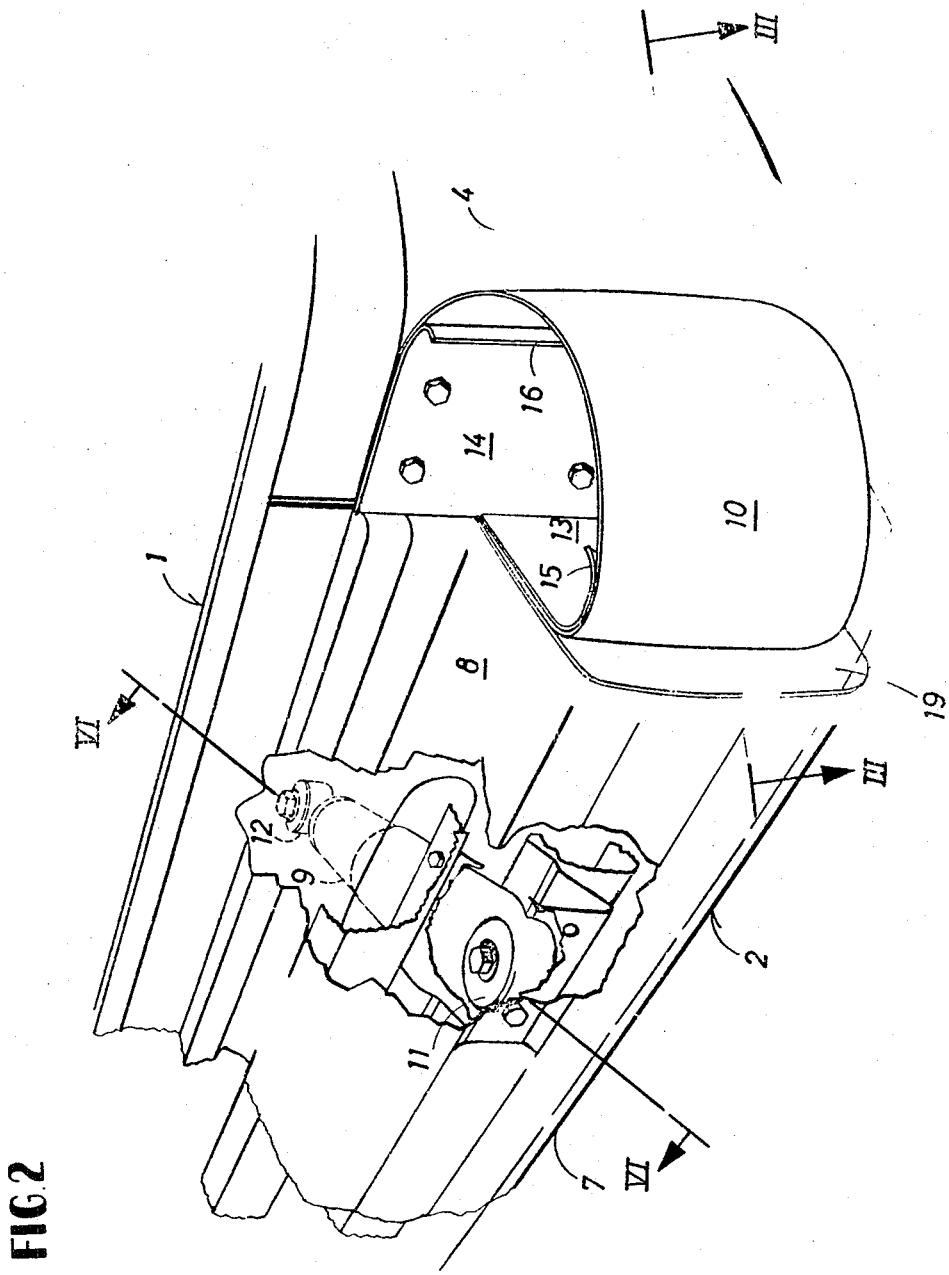
FIG. 2 is an enlarged view of a portion of the structure shown in FIG. 1, some parts being shown in section.
Figure 3:
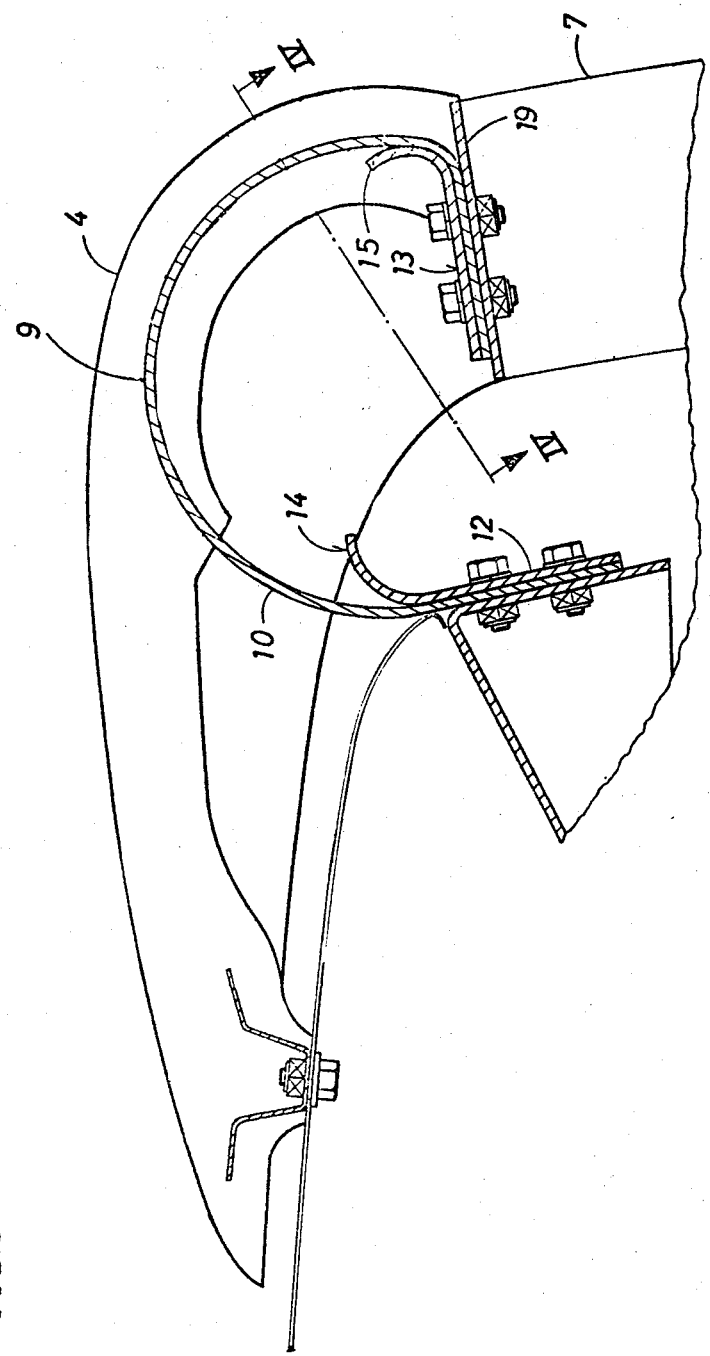
FIG. 3 is a section along the line III — III of FIG. 2.
Figure 5:
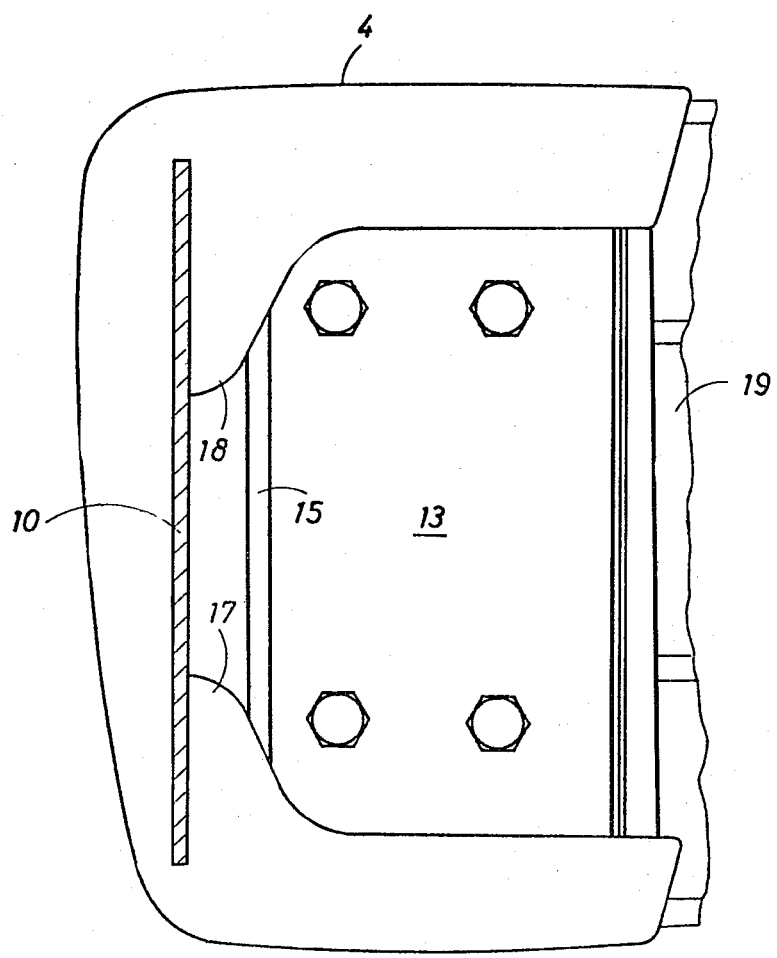
FIG. 5 is similar to FIG. 4 but illustrates a somewhat different structure.

As shown in FIG. 2, the middle portion 7 of the shock absorber 2 is supported by dashpots 9 on the motor car 1. The ends 8 of the middle portion are connected with separate sheet springs 10 which are bent C-shaped or mirror-like about a vertical axis. Telescopic dashpots 9 are located between the springs 10; they connect by joints 11 and 12 having a vertical axis the middle portion 7 of the shock absorber with the motor car 1. Strips 13 and 14 are located within the sheet springs 10. Ends 15 and 16 of the strips are bent inwardly toward the interior of the springs and have a greater curvature than the corresponding parts of the sheet springs 10. The sheet springs 10 are covered by the shock corners 4 and 3. They can be formed into the shock corners 4 by plastic material with a compressed outer surface. The shock corners can be also made of rubber and enclose a part of the sheet springs 10 from top and bottom by check portions 17 and 18 (FIG. 5). The shock corners 3 and 4 are screwed upon transverse closing plates 19 of the middle portion 7 of the shock absorber.

Figure 6:
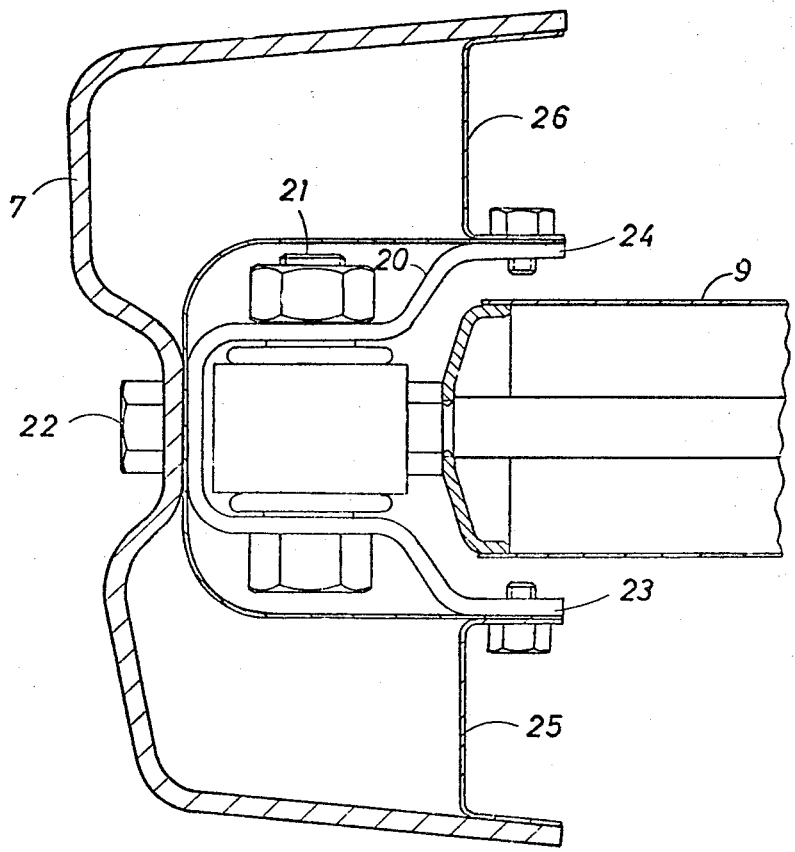
FIG. 6 is a section along the line VI — VI of FIG. 2.

As shown in FIG. 6, the dashpots 9 are supported in separate brackets 20 by bolts 21. The brackets 20 are fixed by screws 22 to the middle portion 7 of the shock absorber. The free ends 23, 24 of the brackets 20 can be supported by bands or pieces 25, 26 upon the middle portion 7 of the shock absorber.

Figure 4:
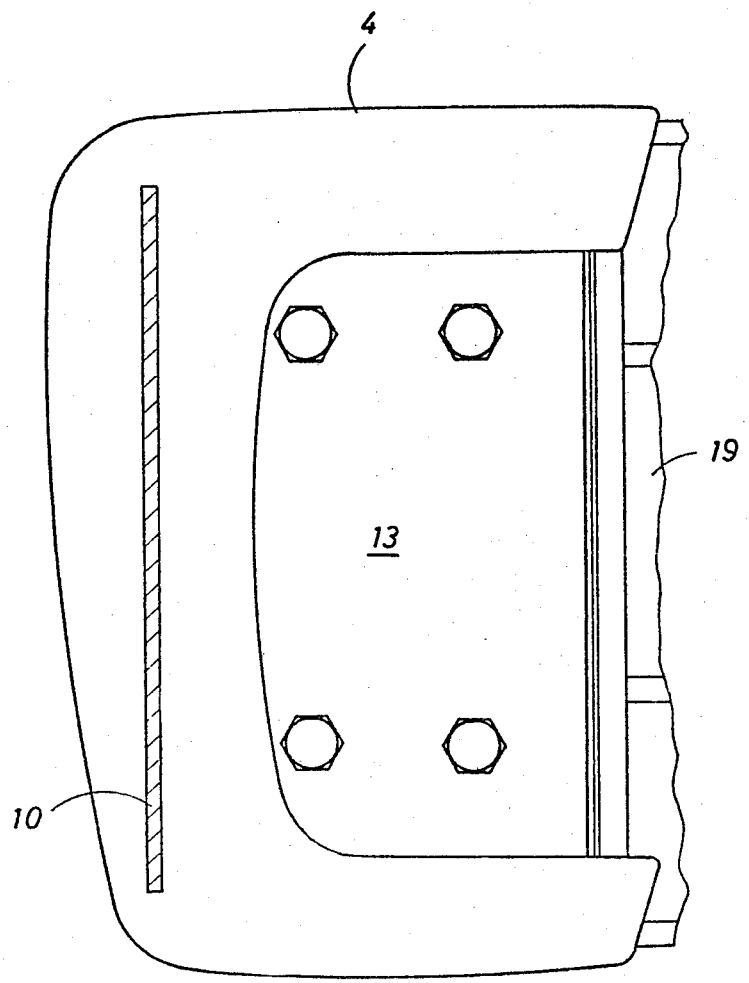
FIG. 4 is a section along the line IV — IV of FIG. 3 illustrating the shock corner and the sheet spring.

The constructions of FIGS. 4 and 5 differ only by the shape of the inner surfaces of the shock edge.

The operation of the device of the present invention is apparent from the above description.

I claim:

1. A shock-receiving device for motor vehicles, comprising a shock receiver, shock absorbers connected with the central portion of said shock receiver, means having joints connecting the shock absorbers with the motor vehicle and having a vertical swinging axis, said means comprising sheet springs which fix the shock receiver at its end to the motor vehicle, said sheet springs being C-shaped and curved about a vertical axis, and having strips located upon the inner side of said sheet springs as path limiters, the ends of said strips directed toward the inner side of the springs having a greater curvature than that of said springs.

2. For use on a motor car, a shock absorber, dashpots connected with said shock absorber, separate springs connected with the ends of said shock absorber and fixing said ends to the motor car, each of said springs being a sheet spring curved about a vertical axis, and strips located within the sheet springs and serving for movement limitation, said strips having ends bent toward the interior of the springs and having a curvature which is greater than that of the sheet springs.

3. A device in accordance with claim 1, comprising brackets, said shock absorbers being mounted in said brackets, and bands connected with the free ends of said brackets and supporting them upon the shock receiver.

4. A device in accordance with claim 3, comprising shock corners consisting of an elastic material and covering said sheet springs and said bands.

5. A device in accordance with claim 4, wherein said shock corners consist of a foam substance with compressed outer surface.

* * * * *